Jan. 15, 1935.   N. TRBOJEVICH   1,987,877
METHOD OF GENERATING WORMS
Original Filed May 14, 1928
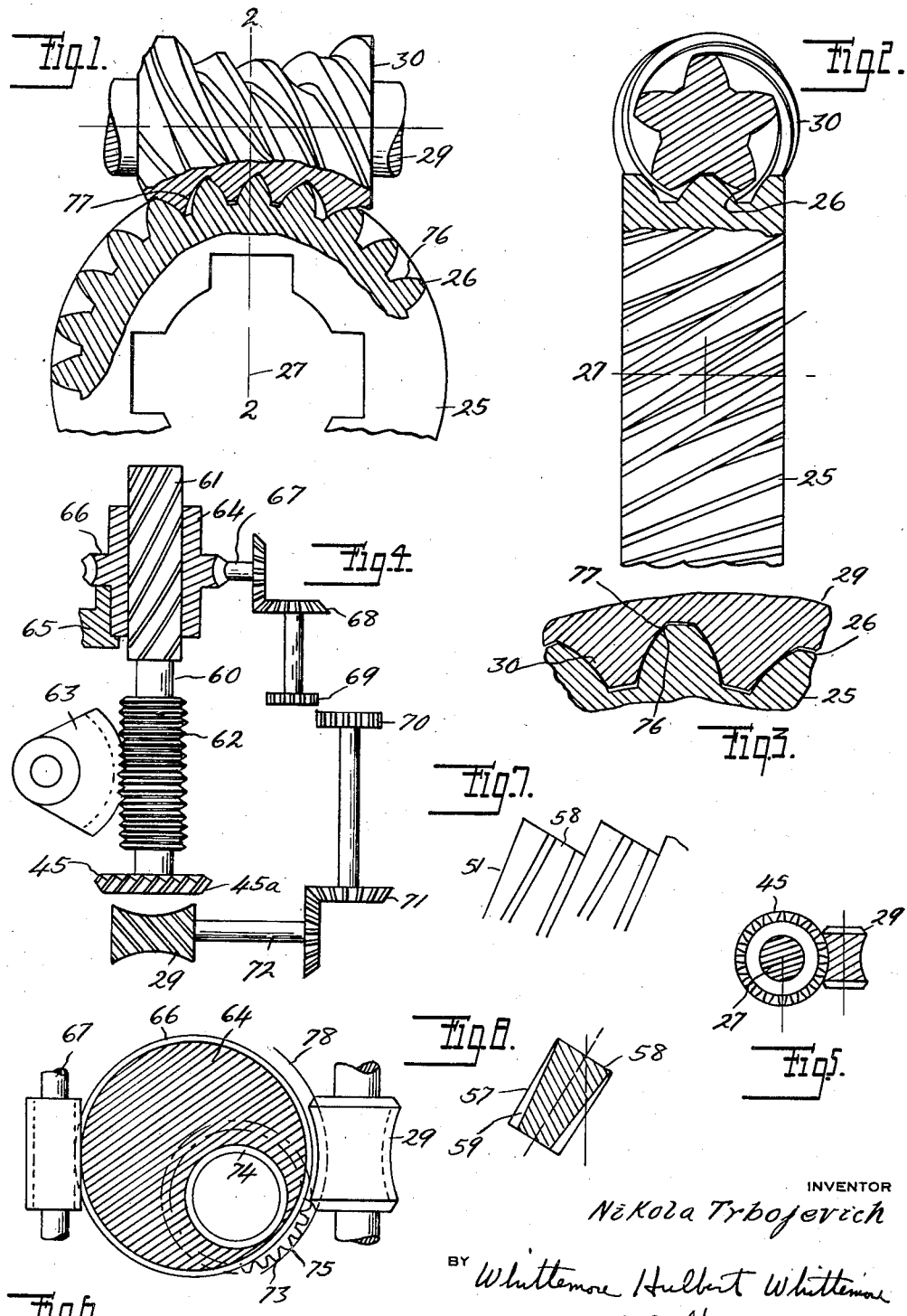
INVENTOR
Nikola Trbojevich
BY Whittemore Hulbert Whittemore
+ Belknap   ATTORNEYS Patented Jan. 15, 1935

1,987,877

UNITED STATES PATENT OFFICE 1,987,877

METHOD OF GENERATING WORMS

Nikola Trbojevich, Detroit, Mich.

Original application May 14, 1928, Serial No. 277,693. Divided and this application January 19, 1931, Serial No. 509,819

5 Claims. (Cl. 90—9)

The invention relates to a method of generating globoid worms by means of reciprocating pinion cutters in a shaping machine. The application is a division of my prior application for patent Serial No. 277,693 filed May 14, 1928.

In the said prior application I disclosed a novel form of a globoid worm, the thread surfaces of which are generated by means of a curve (an involute) when the said curve rotates about an axis perpendicular to its plane and is also simultaneously translated in a direction transverse of the worm axis in a helical path.

I also disclosed therein certain methods of shaping such worms, which methods now will be fully described.

The objects of this invention are to produce accurate and smooth globoid worms of the type mentioned and to provide a method of operation whereby the cutters will cut efficiently, will stay sharp longer and can be repeatedly reground or resharpened without affecting the meshing qualities of the produced worms. In a modification of this invention the object is to generate worms of a considerable or large meridian radius of curvature by means of small and, therefore, inexpensive cutters in a continuous and automatic operation.

In the drawing

Figure 1 is the plan view of my imroved worm drive;

Figure 2 is the section 2—2 thereof;

Figure 3 is an enlarged view of meshing teeth shown in Figure 1;

Figure 4 is an elevation diagrammatically representing the novel and essential operating parts of my improved worm-shaping machine.

Figure 5 is the section 5—5 thereof showing the cutter and worm in mesh;

Figure 6 is a plan view of another shaper, a modification of the shaper represented in Figures 4 and 5;

Figures 7 and 8 are details showing the formation of the cutting teeth of the generating cutter used in these methods.

As is seen from Figures 1 and 2 which show the improved worm drive in two projections, the member 25 is a cylindrical wheel having a plurality of helical teeth 26 and the co-operating member 29 is a globoid worm having a plurality of twisted threads 30 capable of meshing with the said wheel teeth in a line contact. The thread contours 77 (Fig. 3) of the worm 29 are concave and of an inverted involute curvature (somewhat like an internal helical gear) while the tooth flanks 76 of the wheel 25 are also of an involute curvature, but convex at every point.

Owing to the fact that the worm thread 30 is capable of touching the wheel teeth 26 along a series of lines, said lines transversely crossing the said teeth from top to bottom thereof, it follows that if a lamina or a pinion cutter exactly corresponding in its outline to the wheel 25 be constructed and reciprocated along the axis 27 (the axis of the wheel 25) in such a manner as to always remain in mesh with the worm thread surfaces then upon each stroke of the cutter the said series of lines of contact would be scribed upon the worm threads 30. In order to finish the worm threads in their entirety, i. e. from end-to-end and on their both sides, all that is necessary is to impart to the worm and cutter a slow timed rotation in addition to and independent of the said reciprocating motion of the cutter. In that case the worm will be completely finished during its one full revolution.

The shaping machine in which to do this is diagrammaticaly shown in Figures 4 and 5. The pinion cutter 45 is mounted at the end of the ram 60, the upper part 61 of the said ram being helically fluted to the exact lead of the cutter and the lower part 62 being a circular rack. The gear segment 63 oscillates to and from and thereby causes the cutter 45 to reciprocate up and down. The helical portion 61 of the ram engages a corresponding nut or guide 64, said guide being rotatably held in the frame 65 of the machine. The worm gear 66 is integral with the said helical guide 64 and is rotatable by means of a worm 67 and gears 68, 69, 70 and 71. The worm to be cut 29 is also connected to the same train of gearing by means of the horizontal shaft 72 so that a timed relation exists between the rotation of the worm and the cutter.

When the ram 60 reciprocates up and down the cutter merely describes a helical path but does not cause the worm 29 to rotate. However, when the gear train 68 to 71 is actuated both the cutter and the worm will rotate in unison. The last movement is made sufficiently slow in relation to the number of strokes performed by the cutter to produce a finish of the desired smoothness.

Figure 6 shows another shaper operating on a different principle from the one just explained. Here, the cutter 73 having a plurality of helical teeth 75 is of a smaller radius than the meridian circle 78 of the worm to be cut for which reason the cutter ram 74 is mounted eccentric relative to the index wheel 66. However, the rest of the mechanism is in substance the same as before.

The cutter 73 reciprocates in its helical guide and the worm 29 is slowly rotated, said rotation, properly timed, being transmitted both to the worm 67 actuating the cutter cradle 66 as well as to the cutter 73. The worm 29 will be finished from end-to-end during one corresponding swing of the cradle 66. The cutter teeth 75 are of the same pitch, pressure angle and helix angle as the helical wheel 25 from which it follows, first, that the cutter 73 has necessarily fewer teeth than the wheel 25 and, second, its teeth 75 are of a shape different from and conjugate to the shape of teeth 26 of the said wheel. The last named condition implies the fact that the cutter 73 and the wheel 25 are both generated or generable from the same basic rack.

In operation the method shown in Figure 6 is, of necessity, much slower than the method shown in Figure 4. That disadvantage, however, is more than offset in many cases by the savings effected in the cost of the cutters and the weight of the machine, the latter reduction being due to a lighter cut.

Figures 7 and 8 show the preferred method of forming the cutting teeth of the cutters 45 and 73, Figures 4 and 6 respectively. The teeth 57 are sharpened at their ends at the plane faces 58, said faces being approximately at right angles to the helix, are relieved conically about their circumference as at 45a, Figure 4, and are sidewise relieved at their flanks 59 as in Figure 8. The transverse section of the cutter consists of a plurality of convexly-shaped involute cutting edges 76, Figure 3. It is essential that the cutter tooth flanks 59 be relieved by means of side clearance alone and in no other way in order that the cutting edges may retain their positions relative to a fixed base cylinder concentric with the cutter axis after repeated sharpenings. In such a case, while the cutter will of necessity become smaller and the teeth thinner after each sharpening, yet the normal pitch and the pressure angle of the cutter will remain absolutely unchanged. This result could not be obtained unless, first, the teeth are side relieved and, second, the cutting edges are involutes. To my knowledge I am the first to recognize and make use of this involute principle in the design and manufacture of globoid gearing.

It will be noted by inspecting the Figures 4 and 6 that both mechanisms will be operative (in a sense) even if the oscillation of the cutter along its axis is stopped, the other motions continuing. In that case these shaping machines will act as hobbing machines. Thus the mechanism shown in Figure 6 may be used for the production of globoid gearing either as a shaper or a hobber, i. e. with or without the reciprocating motion of the cutter.

What I claim as my invention:

1. A method of generating globoid worms consisting in selecting a pinion-shaped cutter having a plurality of helical cutting teeth arranged about its circumference, in reciprocating the said cutter along its axis in a helical path, in placing the worm to be cut tangentially of the cutter path with its axis transverse thereto and in imparting to the cutter and blank a slow timed rotation until the thread surfaces are finished from end-to-end and on both their sides.

2. A method of generating globoid worms consisting in selecting a pinion-shaped cutter having a plurality of involute cutting edges and a plurality of side relieved tooth flanks all developed from the same base circle, in reciprocating the said cutter in a helical path, in placing the axis of the worm to be cut transversely of the cutter path and in imparting to the cutter and work a slow rotation in a timed relation thereby producing worms of a smooth finish and of a constant normal pitch and pressure angle throughout any number of resharpenings of the said cutter.

3. A method of generating globoid worms consisting in selecting a pinion-shaped cutter having a plurality of helical cutting teeth, in reciprocating the said cutter along its axis in a helical path, in placing the worm to be cut tangentially of the cutter path with its axis transverse thereto, in imparting to the cutter and the blank a slow timed rotation and in imparting to the cutter an additional relative rotation about an axis parallel to and offset from the cutter axis in such a manner that the cutter teeth will gradually roll over the worm threads in the axial plane thereof thus finishing the worm threads from end-to-end.

4. A method of generating globoid worms in which a cutter is selected having fewer teeth than the number of teeth in the completed meridian circle of the globoid, in which the said teeth are of the same pitch and pressure angle and of a curvature conjugate to the worm threads, in which the worm and a cutter are rotated in a timed relation and in which the cutter has an additional rotation about a parallel axis so selected that the cutter teeth will gradually roll over the worm threads in the axial plane thereof thus finishing the worm threads from end-to-end.

5. A method of generating spiral thread convolutions in a globoid worm consisting in reciprocating a cutting tool in a helical path in a direction substantially perpendicular to the worm axis, in translating the said tool in a circular path about an axis lying wholly on the outside of the worm body and in imparting a timed rotation to the worm about its axis in such a ratio as to produce a spiral groove of a predetermined pitch in the said globoid worm.

NIKOLA TRBOJEVICH.